March 19, 1963 K. STEISSLINGER 3,081,681
SHUTTER BLADE CONTROL MECHANISM FOR REFLEX CAMERA
Filed Aug. 24, 1959 4 Sheets-Sheet 1

Kurt Steisslinger
INVENTOR.

BY
ATTORNEYS

March 19, 1963     K. STEISSLINGER     3,081,681
SHUTTER BLADE CONTROL MECHANISM FOR REFLEX CAMERA
Filed Aug. 24, 1959     4 Sheets-Sheet 2

Kurt Steisslinger
INVENTOR.

BY R. Frank Smith
Steve W. Gremban
ATTORNEYS

March 19, 1963  K. STEISSLINGER  3,081,681
SHUTTER BLADE CONTROL MECHANISM FOR REFLEX CAMERA
Filed Aug. 24, 1959  4 Sheets-Sheet 3

Kurt Steisslinger
INVENTOR.

BY R. Frank Smith
Steve W. Grember
ATTORNEYS

March 19, 1963  K. STEISSLINGER  3,081,681
SHUTTER BLADE CONTROL MECHANISM FOR REFLEX CAMERA
Filed Aug. 24, 1959  4 Sheets-Sheet 4

Kurt Steisslinger
INVENTOR.

BY R. Frank Smith
Steve W. Grambow
ATTORNEYS

United States Patent Office 3,081,681
Patented Mar. 19, 1963

3,081,681
SHUTTER BLADE CONTROL MECHANISM FOR REFLEX CAMERA
Kurt Steisslinger, Stuttgart-Wangen, Germany, assignor to Eastman Kodak Company, Rochester, N.Y., a corporation of New Jersey
Filed Aug. 24, 1959, Ser. No. 835,722
Claims priority, application Germany Sept. 18, 1958
6 Claims. (Cl. 95—42)

This invention relates generally to cameras, and more specifically to an improved shutter blade control mechanism for a reflex camera for opening the shutter blades and releasably holding them in the open position.

Reflex cameras having a shutter releasable by the mirror as it travels from an operative light blocking position in which it intercepts light rays passing through the objective to a normal inoperative position in which it is removed from the path of the light rays are well known. The mirror is said to be in an operative position when it is disposed in a plane at an angle of 45° with respect to the optic axis of the objective lens, and reflects the image formed by the objective lens through a viewing screen. The mirror is in an inoperative position when it has been tilted upwardly out of the path of the light rays which are then free to strike the light-sensitive photographic material. Now in reflex cameras of the type indicated, operation of the film-winding mechanism for advancing the film automatically causes the mirror and light-blocking flap to be moved into their operative positions, the shutter to be cocked and the shutter blades moved into a wide-open position so that the operator may view the scene desired to be photographed on the viewing screen. Although these operations are all accomplished by the operation of the film-winding mechanism, they are of course operated in timed relation so that the mirror and light-blocking flap are in a light-blocking position before the shutter blades are opened. Once the operator is satisfied with the scene to be photographed, the camera release button is depressed, automatically causing the shutter blades to close, the mirror and flap to be moved into their inoperative positions, and the shutter to be released to make an exposure. Once again these operations are carried on in timed relation so that the shutter blades are closed before the mirror and flap are moved out of their light-blocking position, and the shutter opened and closed to make an exposure after the mirror and flap are in their inoperative positions. A reflex camera of this general type is disclosed in U.S. applications Serial Nos. 577,681 and 692,357 by Paul G. Harter and Irwin E. Staudt; and U.S. application Serial No. 629,466 by Paul G. Harter, now U.S. Patents 2,916,978; 2,920,544; and 2,925,023, respectively.

As indicated heretofore, in reflex cameras it is necessary to provide a control mechanism for opening the shutter blades into a wide-open position to permit the operator to view the scene desired to be photographed on the viewing screen. In most cameras of the reflex type, the control mechanism opens the shutter blades during the process of advancing the film and cocking the shutter. It is further necessary for the control mechanism to permit the shutter blades to close quickly after the camera release button is depressed so that the mirror and light-blocking flap may be free to move into their inoperative positions. After this occurs, the shutter mechanism completes its run-down, opening and closing to make an exposure. This invention is directed to an improved control mechanism of this type.

It is therefore one of the primary objects of the present invention to provide an improved shutter blade control mechanism for a reflex camera that is of simple design and construction, thoroughly reliable and efficient in operation, and economical to manufacture.

Another object of this invention is to provide an improved shutter blade control mechanism for a reflex camera having means for releasably holding the shutter blades in the wide-open position.

Still another object of this invention is the provision of an improved shutter blade control mechanism for a reflex camera adapted to eliminate shutter blade rebound when the shuter blades are rapidly moved from the wide-open position to the closed position.

Objects and advantages other than those set forth above will be apparent from the following description when read in connection with the accompanying drawing, in which.

Figure 1:
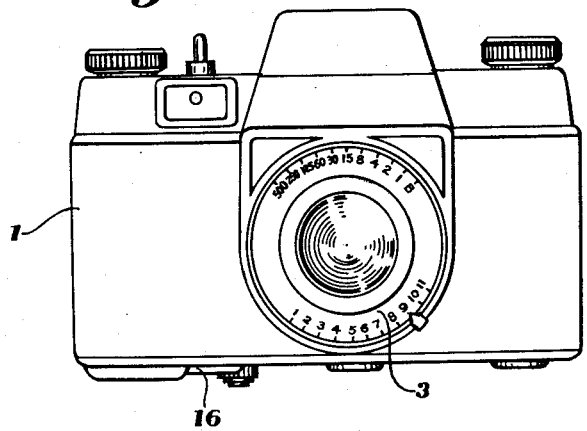
FIG. 1 is a front elevation view of a single-lens reflex camera in which a preferred embodiment of the present invention is incorporated.

As shown in the drawings, this invention is embodied in a single-lens reflex camera having a shutter-mounting plate 2 secured thereto to which a shutter 3 may be detachably secured. The shutter 3 is a commercially available item generally referred to in the trade as a Synchro-Compur shutter. This shutter is adapted when released from a cocked position in which the shutter blades 4 are wide open, to run down initially closing shutter blades 4, and then opening and closing them to make an exposure as is well known.

Figure 2:
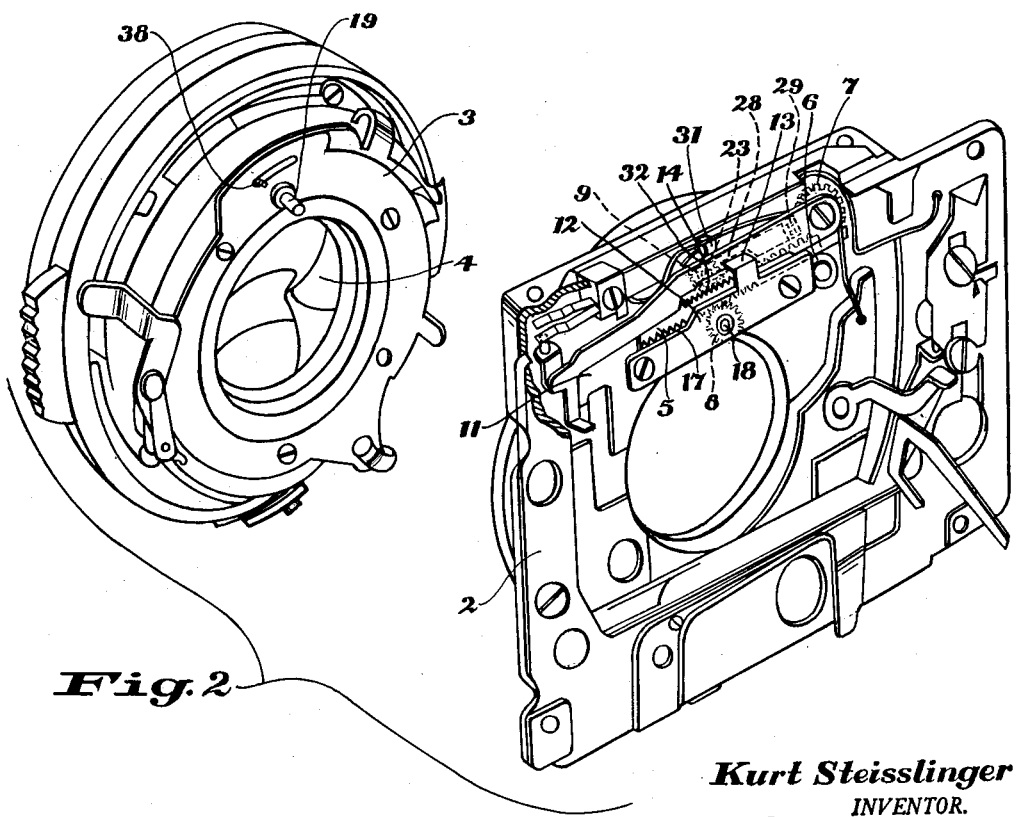
FIG. 2 is an exploded view in perspective showing the shutter and shutter-mounting plate of the reflex camera of FIG. 1.
Figure 4:
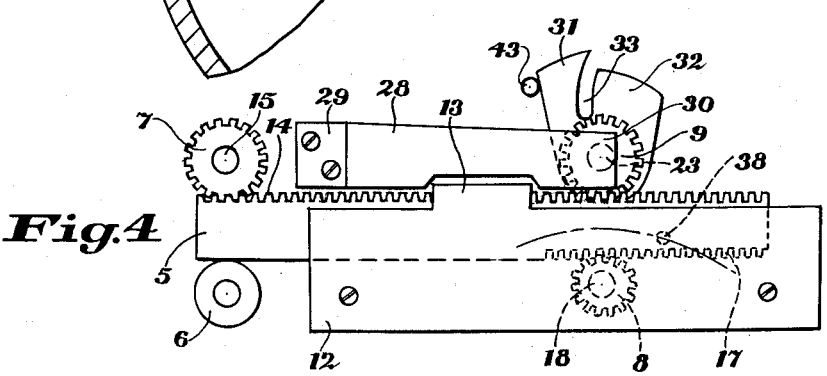
FIG. 4 is an enlarged diagrammatic view in elevation of the shutter blade control mechanism of FIG. 2 showing the position of the control mechanism after the shutter has completely run down.
Figure 9:
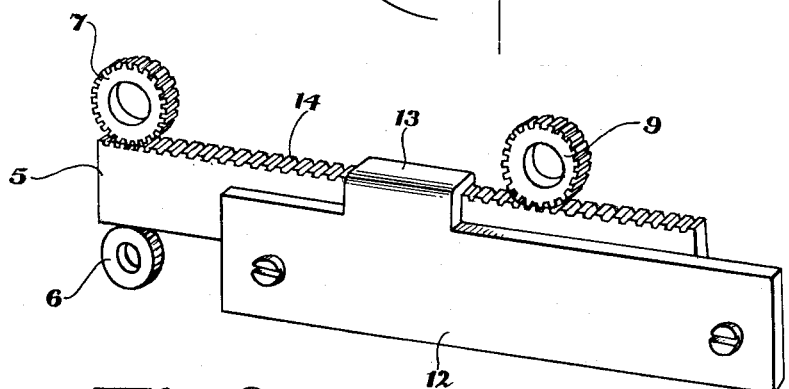
FIG. 9 is an enlarged detail view in perspective showing the gear rack and hold-down plate that cooperates with the shutter blade control mechanism.

A reciprocally movable gear rack 5 seen in FIG. 4 is guided for reciprocal movement by guide roller 6 and gear 7 engaging opposite sides of gear rack 5 at one end, and gears 8, 9 engaging opposite sides of rack 5 at the opposite end. The gear rack 5 is held in slidable engagement with a face 11 of shutter-mounting plate 2 as best seen in FIG. 2 by means of a hold-down member 12 screwed to plate 2 as seen in FIGS. 2 and 9. The hold-down member 12 is provided with a lug 13 extending over the edge of gear rack 5 to prevent the gear rack from exerting an excessive pressure against gear 9. The gear 7 which engages a toothed portion 14 of gear rack 5 is mounted on a shaft 15 which is connected to the film-winding mechanism of which only the winding lever 16 is shown in FIG. 1. The film-winding mechanism is of a known type and is described in detail in the above-identified pending U.S. patent applications. The gear 8 is in engagement with another toothed portion 17 of gear rack 5 and is rigidly secured to a spindle 18 journaled in a bearing, not shown. The spindle 18 has a coupling at one end, not shown, for drivingly connecting gear 8 and spindle 18 to a shutter-cocking shaft 19 as seen in FIG. 2 when shutter 3 is secured to mounting plate 2. Once again, the mechanism for driving gear 8 and spindle 18 is not shown since it does not form a part of the present invention, and is further described and shown in the above-identified U.S. applications.

Figure 8:
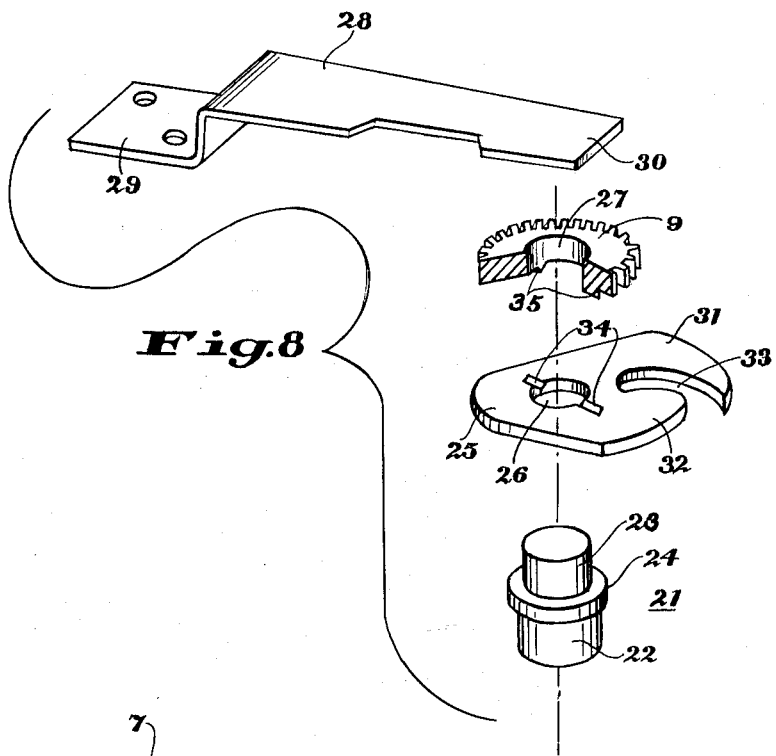
FIG. 8 is an exploded view in perspective of the shutter blade control mechanism.

The shutter blade control mechanism seen best in FIG. 8 comprises a shaft 21 having a cylindrical portion 22 adapted to be pressed into the camera body for rigidly securing shaft 21 thereto. The shaft 21 further has another cylindrical portion 23 terminating in a collar 24. A pawl 25 has an opening 26 through which portion 23 extends and forms a pivot about which pawl 25 may be turned. The gear 9 also has an opening 27 for receiving portion 23 which forms a pivot about which gear 9 may rotate. A leaf spring 28 has one end 29 secured to the camera body and the free end 30 bearing upon gear 9 for urging gear 9 and pawl 25 against collar 24. The pawl 25 has a pair of fingers 31, 32 which merge together to form a curved slot 33 therebetween, and the fingers 31, 32 are of unequal length for a purpose to be explained hereinafter. The pawl 25 further has oppositely disposed V-shaped recesses or grooves 34 adjacent opening 26 for receiving complementary projections 35 formed on gear 9.

Figure 3:
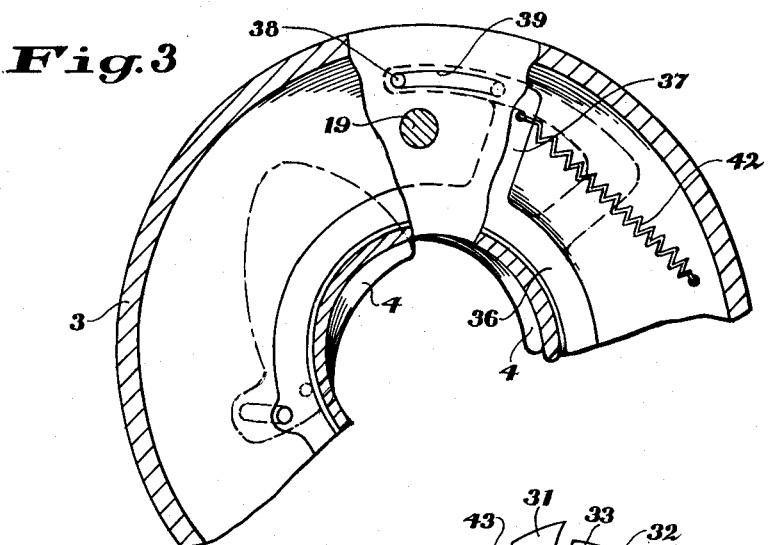
FIG. 3 is a segmental elevation view of the back end of the shutter showing the shutter blade mechanism.

The shutter 3, as best seen in FIGS. 2 and 3, has a ring 36 connected to shutter blades 4 and which ring 36 is provided with a radially extending arm 37 having a pin 38 at one end extending through an arcuate slot 39 in the shutter casing. As is well known in the art, movement of pin 38 and ring 36 between the full-line and broken-line positions shown in FIG. 3 moves shutter blades 4 between open and closed positions respectively.

Figure 5:
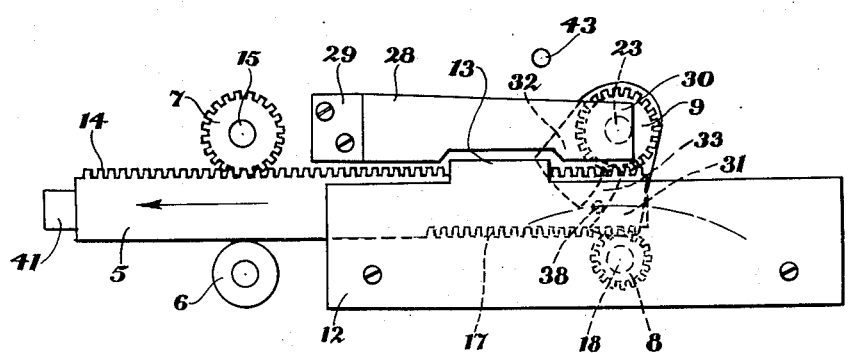
FIG. 5 is a view similar to FIG. 4 showing the position of the shutter blade control mechanism after the film has been advanced, the shutter cocked and the shutter blades moved into the wide-open position.
Figure 6:
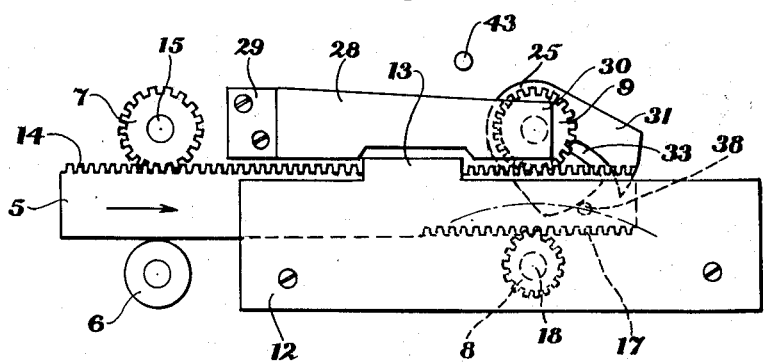
FIG. 6 is a view similar to FIG. 4 showing the position of the shutter blade control mechanism after the shutter mechanism has run down sufficiently to close the shutter blades.

In the operation of this invention, let us assume initially that the operator has just completed making an exposure. The shutter blade control mechanism would then be in the position shown in FIG. 4. The operator must then operate the film-winding handle 16 for advancing the film and cocking shutter 3. While film-winding handle 16 is being operated, gear 7 moves gear rack 5 in the direction of the arrow seen in FIG. 5 up against a stop 41 shown in FIGS. 5 and 7. The gear rack 5 as it is moved drives gear 8, spindle 18 and shaft 19 in a direction to cock the shutter 3. The gear rack 5 further drives gear 9 turning pawl 25. The pin 38 is so positioned that as pawl 25 is turned about shaft 23, finger 31 engages pin 38, driving it in a direction to open shutter blades 4 as seen in FIG. 5. The pawl 25 and gear 9 are so positioned with respect to rack 5 that pawl 25 moves pin 38 and shutter blades 4 into a wide-open position before gear rack 5 reaches stop 41. Since pawl 25 is prevented from further turning on shaft 23 by pin 38 when it reaches its wide-open position, the projections 35 of gear 9 as it is driven further by rack 5 cams gear 9 outwardly against the bias of spring 28 with projections 35 now engaging the upper face of pawl 25. The pressure of spring 28 and gear 9 acting against pawl 25 frictionally holds pawl 25 against pin 38 thereby preventing shutter blades 4 from closing. At this point, camera 1 is in a position with the film advanced, shutter 3 cocked, and shutter blades 4 in a wide-open position to permit the operator to view the scene which is to be photographed. To photograph a desired scene, the operator depresses the camera release button releasing the shutter mechanism which is adapted to run down under the force of the shutter spring from a cocked position in which shutter blades 4 are open into a closed position and then to open and close shutter blades 4 to make an exposure. The gear 8 and spindle 18, which are driven by the shutter spring, drive gear rack 5 in the direction of the arrow, seen in FIG. 6, which in turn drives gear 9. As gear 9 is driven, it initially slides relative to pawl 25 until projections 35 once again engage grooves 34 for driving pawl 25 along with gear 9. As pawl 25 is turned, a spring 42 seen in FIG. 3 urges ring 36 and shutter blades 4 into their closed position. Any tendency of shutter blades 4 to rebound as they are driven into their closed position is prevented by the peripheral edge of finger 32 which forms a stop for pin 38 as seen in FIG. 6. After shutter blades 4 are closed, the shutter run-down continues with shutter blades 4 opening and closing to make the exposure. After the termination of the exposure, the shutter blade control mechanism returns to the position shown in FIG. 4.

Figure 7:
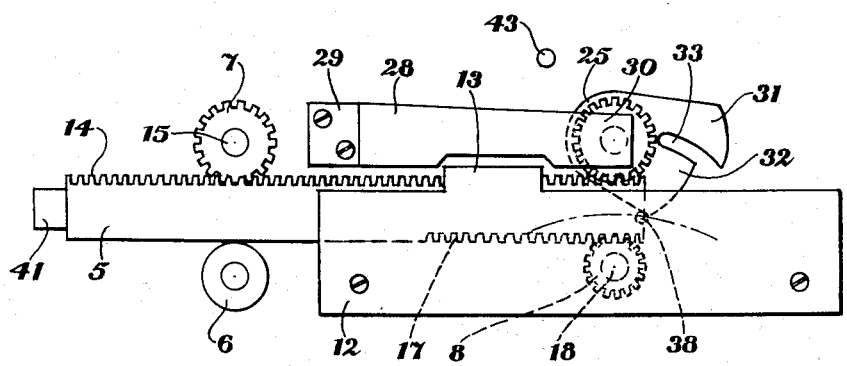
FIG. 7 is a view similar to FIG. 4 showing the position of the shutter blade control mechanism when the film is being advanced and the shutter cocked while the shutter delay mechanism is operating.

In a reflex camera of the type described, the operator may wish to delay the operation of shutter 3 after the camera release button has been depressed to give the operator sufficient time to move into the scene which is to be photographed. Delay mechanisms of this type are well known in the art and many shutters are commercially available on the market having a delay mechanism of this type directly incorporated therein. Such delay mechanisms are normally constructed so that movement of a lever operatively connecting the delay mechanism to the shutter mechanism also cams over shutter blade ring 36 a small amount but not enough to open shutter blades 4. Then if the situation should arise where the operator wishes to advance the film and cock shutter 3 after the delay mechanism has been released, the pawl 25 engages pin 38 as seen in FIG. 7 and is prevented from further turning by pin 38. As soon as pawl 25 is blocked, projections 35 move out of grooves 34 and gear 9 continues its rotation with projections 35 sliding on the top face of pawl 25. When the time delay mechanism completes its run-down and releases the shutter mechanism, gear 8 which is driven by the shutter spring drives rack 5 in the direction of the arrow seen in FIG. 6. The pawl 25 is driven by the frictional engagement of projections 35 with the face of pawl 25 until finger 31 strikes a stop 43 whereupon gear 9 continues to rotate until projections 35 enter grooves 34. The shutter blade control mechanism is then in the position shown in FIG. 4.

The invention has been described in detail with particular reference to preferred embodiments thereof, but it will be understood that variations and modifications can be effected within the spirit and scope of the invention as described hereinabove and as defined in the appended claims.

I claim:

1. In a shutter blade control device for a single lens reflex camera of the type having a shutter mechanism provided with shutter blades movable between open and closed positions and adapted to be moved to the open position to permit the operator to view the scene to be photographed before the shutter mechanism is released to make an exposure, the combination comprising: a shutter mechanism movable to and from a cocked position; shutter mechanism cocking means; shutter blades; and driven means interrelating said shutter mechanism cocking means and shutter blades and driven by said shutter mechanism cocking means as it moves said shutter mechanism to its cocked position, for moving said shutter blades into their open position and releasably holding said blades in said open position.

2. The invention according to claim 1 wherein said shutter mechanism cocking means comprises a gear rack, and said driven means comprises a pawl driven by said rack.

3. The invention according to claim 1 wherein said shutter mechanism cocking means comprises a reciprocally movable gear rack; and said driven means comprises a gear driven by said rack, a pivotal pawl driven by said gear, and a shutter blade actuating mechanism connected to said shutter blades and driven by said pawl for moving said shutter blades into their open position.

4. The invention according to claim 3 wherein said shutter blade actuating mechanism comprises a spring biased ring having a pin adapted to open said blades when moved by said pawl in one direction against the bias of said spring.

5. The invention according to claim 4 wherein said gear has a projection, said pawl has a recess for receiving said projection and a pair of fingers merging to form a passageway therebetween for receiving said pin upon turning of said pawl, one of said fingers being longer than said other finger and adapted to engage said pin for urging said blades into said open position, said other finger adapted to provide a stop for said pin to prevent rebound of said shutter blades when they return to their closed position.

6. The invention according to claim 5 wherein a spring constantly urges said gear into engagement with said pawl, and said projection is provided with a slanted edge to facilitate camming said projection out of said recess against the bias of said spring upon continued turning of said gear after said pawl has moved said shutter blades to the open position, said projection in frictional engagement with the surface of said pawl tending to releasably hold said pawl and shutter blades in the open position.

References Cited in the file of this patent

UNITED STATES PATENTS

| | | |
|---|---|---|
| 2,608,921 | Studdert | Sept. 2, 1952 |
| 2,730,025 | Faulhaber | Jan. 10, 1956 |
| 2,916,978 | Harter et al. | Dec. 15, 1959 |
| 2,926,575 | Gebele | Mar. 1, 1960 |

FOREIGN PATENTS

| | | |
|---|---|---|
| 769,086 | Great Britain | Feb. 27, 1957 |